United States Patent [19]

McIntyre

[11] Patent Number: 5,040,808
[45] Date of Patent: Aug. 20, 1991

[54] UTILITY CART

[76] Inventor: Edward W. McIntyre, Rt. #2, Box 381, Florence, Ala. 35630

[21] Appl. No.: 548,486

[22] Filed: Jun. 25, 1990

[51] Int. Cl.[5] ............................................. B62B 1/26
[52] U.S. Cl. ................................ 280/47.19; 248/129; 248/907; 280/79.7
[58] Field of Search ................. 280/47.19, 47.35, 79.7, 280/47.26; 248/98, 129, 137, 907

[56] References Cited

U.S. PATENT DOCUMENTS

| D. 146,848 | 6/1947 | Brickson | 280/47.19 |
|---|---|---|---|
| 666,880 | 1/1901 | Zerrhan | 248/137 |
| 2,769,482 | 11/1956 | Carlson | 280/47.35 |
| 2,855,210 | 10/1958 | Joyce | 280/47.19 |
| 2,923,416 | 2/1960 | Vogel | 248/907 |
| 2,931,517 | 4/1960 | Youngblood et al. | 248/907 |
| 3,111,333 | 11/1963 | Marini et al. | 280/47.19 |
| 3,341,219 | 9/1967 | Marini et al. | 280/47.19 |
| 3,463,502 | 8/1969 | Gough | 280/47.19 |
| 3,479,047 | 11/1969 | Bailey | 280/47.19 |
| 3,762,738 | 10/1973 | Christina | 248/907 |
| 4,357,029 | 11/1982 | Marini et al. | 248/129 |
| 4,362,309 | 12/1982 | Stamper | 280/47.19 |
| 4,600,109 | 7/1986 | Schulz | 248/907 |
| 4,712,803 | 12/1987 | Garcia | 280/652 |

Primary Examiner—Andres Kashnikow
Assistant Examiner—Eric Culbreth
Attorney, Agent, or Firm—John C. Garvin, Jr.

[57] ABSTRACT

A lightweight, durable, and inexpensive utility cart made almost exclusively of PVC pipe for storing and transporting trash containers and other objects.

The utility cart comprises a generally rectangular lower or bottom section for supporting the trash containers placed in the cart, a generally rectangular top section for maintaining the trash containers in upright, stable, positions, and four corner pipes for holding the bottom and top sections in spaced-apart relationship. The bottom section has a pair of wheels mounted on an axle at one end and projections mounted at its other end for leveling the bottom section when the utility cart is in its stationary, storing condition. The upper or top section has a pair of pipes at one end to provide handles which can be easily engaged by a person to push or pull the cart to transport the trash containers within the cart.

9 Claims, 4 Drawing Sheets

UTILITY CART

TECHNICAL FIELD

This invention relates to a utility cart, and more particularly to a utility cart which is adapted for holding, storing, and transporting trash or garbage containers and which is constructed almost exclusively of prefabricated, rigid, molded plastic pipe.

BACKGROUND OF THE INVENTION

The utility cart of the present invention is particularly designed and constructed for domestic use and serves to support, store and transport trash or garbage containers in an elevated position out of contact with the ground, thus minimizing deterioration of the containers and the cart.

While the cart of the present invention has been primarily designed for supporting, storing and transporting trash or garbage containers, the cart of the present invention obviously may be utilized for many other purposes.

Utility carts adapted for domestic use for holding, storing and transporting trash or garbage containers have been known and used for many years. A number of patents have been granted on such utility carts and these include: U.S. Pat. Nos. 4,457,029 (Marini et al); 3,341,219 (Marini et al); 4,600,109 (Schulz); 3,463,502 (Gough); 2,855,210 (Joyce); 4,362,309 (Stamper); and 3,111,333 (Marini et al).

The Marini et al U.S. Pat. No. (4,457,029) discloses a utility cart for holding, storing and transporting a plurality of trash containers comprised of a plurality of prefabricated, rigid, molded plastic components intended to be assembled by a consumer. This cart includes a pair of substantially U-shaped side structures joined together at the bottom by a rear cross bar and a front axle which also function to support trash containers stored in the cart. This cart further includes a generally rectangularly shaped frame joined to the pair of substantially U-shaped side structures at their upper edges for retaining and holding trash containers in place, a pair of wheels mounted on the front axle and two handles for pushing or pulling the cart. The numerous pieces of prefabricated plastic components making up the cart are joined together through bolts inserted through openings in the plastic components.

Each of the Marini et al U.S. Pat. Nos. (3,341,219 and 3,111,333) discloses a utility cart comprised of a plurality of tubular structural elements which form a front section, a rear section, a load supporting and bracing section, upper side sections, a plurality of nuts and bolts for joining the numerous pieces of tubular structural elements, a pair of ground engaging wheels mounted on an axle in the load supporting and bracing section adjacent to the front section, and two handles on the rear section for pushing or pulling the cart.

The Schulz patent, in the embodiment shown in FIG. 5, discloses a utility cart including a platform, four wheels mounted on the platform, a pair of upright posts attached to the platform, and trash container retaining means hinged to the pair of upright posts. The trash container retaining means includes a plurality of elements made from tubular materials such as electrical conduit or PVC pipe joined together by conventional means such as adhesives, screws or threaded fittings.

The Gough patent discloses a wheeled utility cart for storing and transporting a plurality of trash containers, the cart being primarily formed of aluminum tubing bolted together and having chain sections for separating compartments of the cart and for retaining the trash containers on the cart. The Joyce patent discloses a wheeled utility cart fabricated of numerous pieces of tube or rod stock bolted together for storing and transporting trash containers, which cart includes one or more chains which assist in keeping the lids of the trash containers in place. The Stamper patent discloses a wheeled trash container hauler including longitudinally extending tubular members for supporting and retaining trash containers placed therein, the tubular members being interconnected by front and rear U-shaped members and handles for pushing or pulling the cart, the tubular and U-shaped members being bolted together.

The prior art utility carts have presented many problems and disadvantages particularly when compared to the utility cart of the present invention. Being bolted together by a large number of nuts and bolts, most of the prior art carts have separated or broken apart either through oxidation of the nuts and bolts or through excessive wear, thus requiring repeated repairs after a relatively short period of use. In addition to nuts and bolts, many of the prior art carts used numerous other metallic parts which would rust and deteriorate after a relatively short period of time. Most of the prior art carts also had very narrow wheel bases, thus making the cart somewhat unstable both while in a stationary, storing, position and while trash containers were being transported between locations. Many of the prior art carts also had limited support for the bottom and sides of the trash containers stored on the cart, thus permitting a trash container to be easily capsized and spilling its contents. There is a need, therefore, for a rugged, durable, and inexpensive utility cart which overcomes the problems and disadvantages of the prior art utility cart. The utility cart of the present invention fulfills these needs.

Accordingly, it is an object of the present invention to provide a utility cart made from lightweight, but durable, material for supporting, storing and transporting trash containers.

A further object of the present invention is to provide a utility cart made up of readily available, inexpensive, materials which are light in weight and capable of being quickly assembled by a relatively inexperienced person.

A still further object of the present invention is the provision of a utility cart, particularly designed to support, store and transport one or more trash containers, but which may be also utilized for supporting, storing and transporting other types of containers or objects.

Another object of the present invention is the provision of a lightweight, but durable, utility cart made of preformed and pre-cut PVC members and other elements which may be conveniently packed and shipped in an unassembled condition and thereafter quickly and easily assembled by the user without the need for special tools or mechanical skills.

These objects as well as other objects of the present invention will become more readily apparent from the following description taken in conjunction with the accompanying drawings.

SUMMARY OF THE INVENTION

In accordance with the present invention, a utility cart is provided which is lightweight, durable, and inexpensive to manufacture and assemble. The utility cart is of generally cube, rectangular, shape and is comprised of a plurality of pre-cut tubular pipes, T-fittings, three-way elbow fittings, four-way elbow fittings, end caps, bearings, wheels and an axle. The pipes, fittings, end caps and bearings are made of PVC material, preferably solar certified, which are appropriately joined by PVC cement or adhesive or by a limited number of stainless steel screws.

More specifically the utility cart of the present invention includes a generally rectangular bottom section for supporting the trash containers placed in the cart, a generally rectangular top section for maintaining the trash containers in upright, stable, positions, and four corner pipes for holding the bottom and top sections in spaced-apart relationship. The bottom section has a pair of wheels mounted on an axle at one end and projections mounted at its other end for leveling the bottom section when the utility cart is in its stationary, storing condition. The top section has a pair of pipes at one end to provide handles which can be easily engaged by a person to push or pull the cart to transport the trash containers within the cart.

By producing a utility cart of pre-cut, molded PVC components and securing the components by PVC cement or with PVC cement and a limited number of stainless steel screws as described in the present application, substantially all problems and disadvantages of the prior art utility carts described above have been overcome. The durable utility cart of the present invention can be readily and quickly made from off-the-shelf components, relatively inexpensively, and assembled by persons possessing minimum mechanical skills.

DESCRIPTION OF THE PREFERRED EMBODIMENTS

Figure 1:
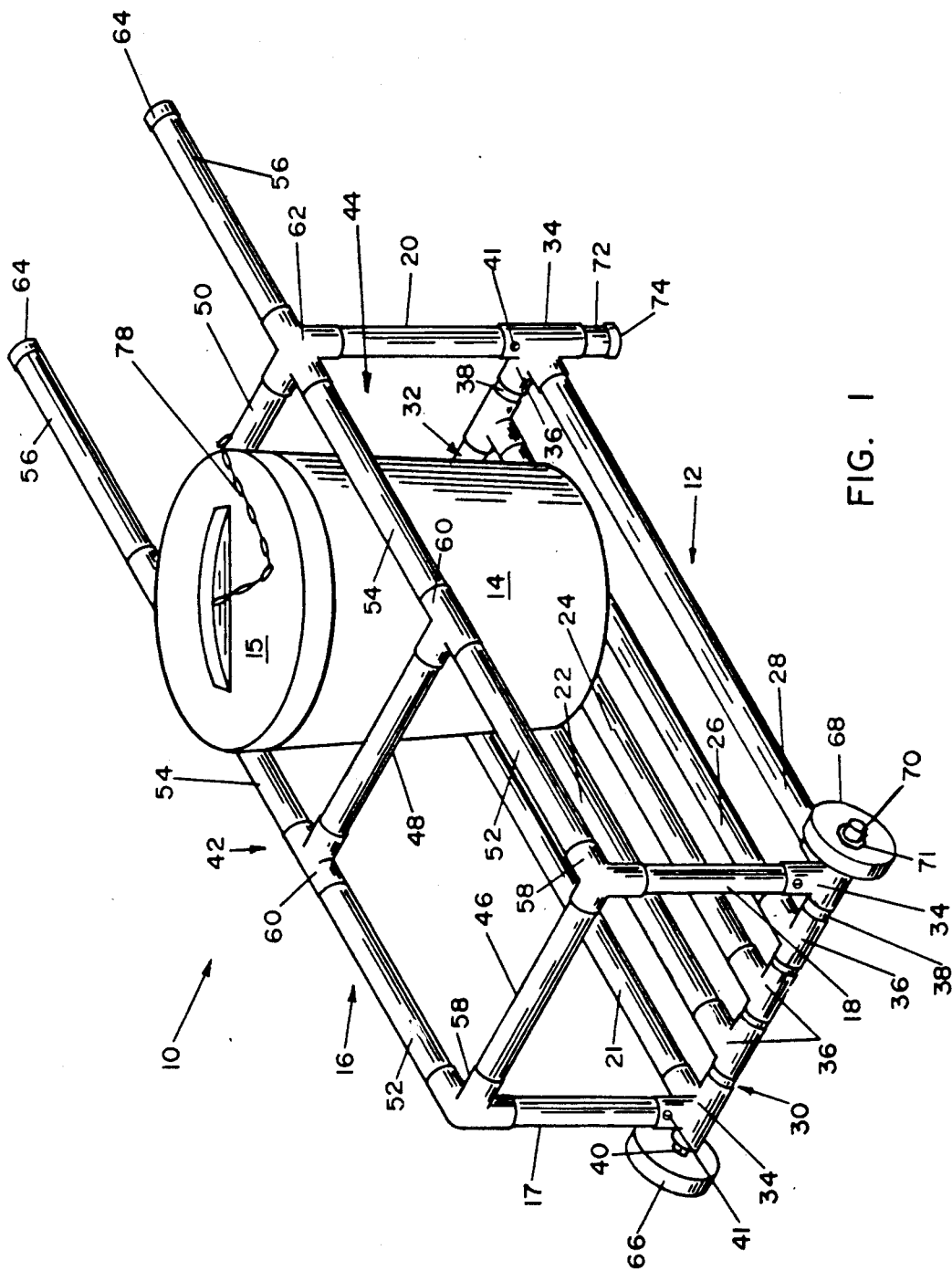
FIG. 1 is a front perspective view of the preferred embodiment of the invention with one trash container stored therein.

Referring now more specifically to the drawings, the numeral 10 generally designates the cart of the instant invention made almost exclusively of PVC pipe. As shown in FIG. 1, cart 10 comprises a generally rectangular bottom or lower section 12 for supporting one or more trash containers 14 with lid 15, a generally rectangular top or upper section 16 for maintaining one or more trash containers 14 in upright, stable positions, and corner pipes 17, 18, 19 and 20 for holding bottom section 12 and top section 16 in spaced apart relationship.

As shown in FIG. 1, bottom section 12 is comprised of five parallel PVC pipes 21, 22, 24, 26 and 28, joined at their ends to parallel cross members generally designated by reference numerals 30 and 32 and designated as the front cross member and the rear cross member, respectively. Each of front cross member 30 and rear cross member 32 is comprised of a pair of outer four-way elbow fittings 34, three intermediate T-fittings 36, and four short PVC pipes 38 connecting outer four-way elbow fittings 34 and intermediate T-fittings 36. Front cross member 30 also includes bearings 40 made of PVC material secured to the outer end of four-way elbow fittings 34. The parts making up bottom section 12 are secured to each other by PVC cement or stainless steel screws 41 in the arrangement depicted in FIGS. 1 and 3.

Figure 2:
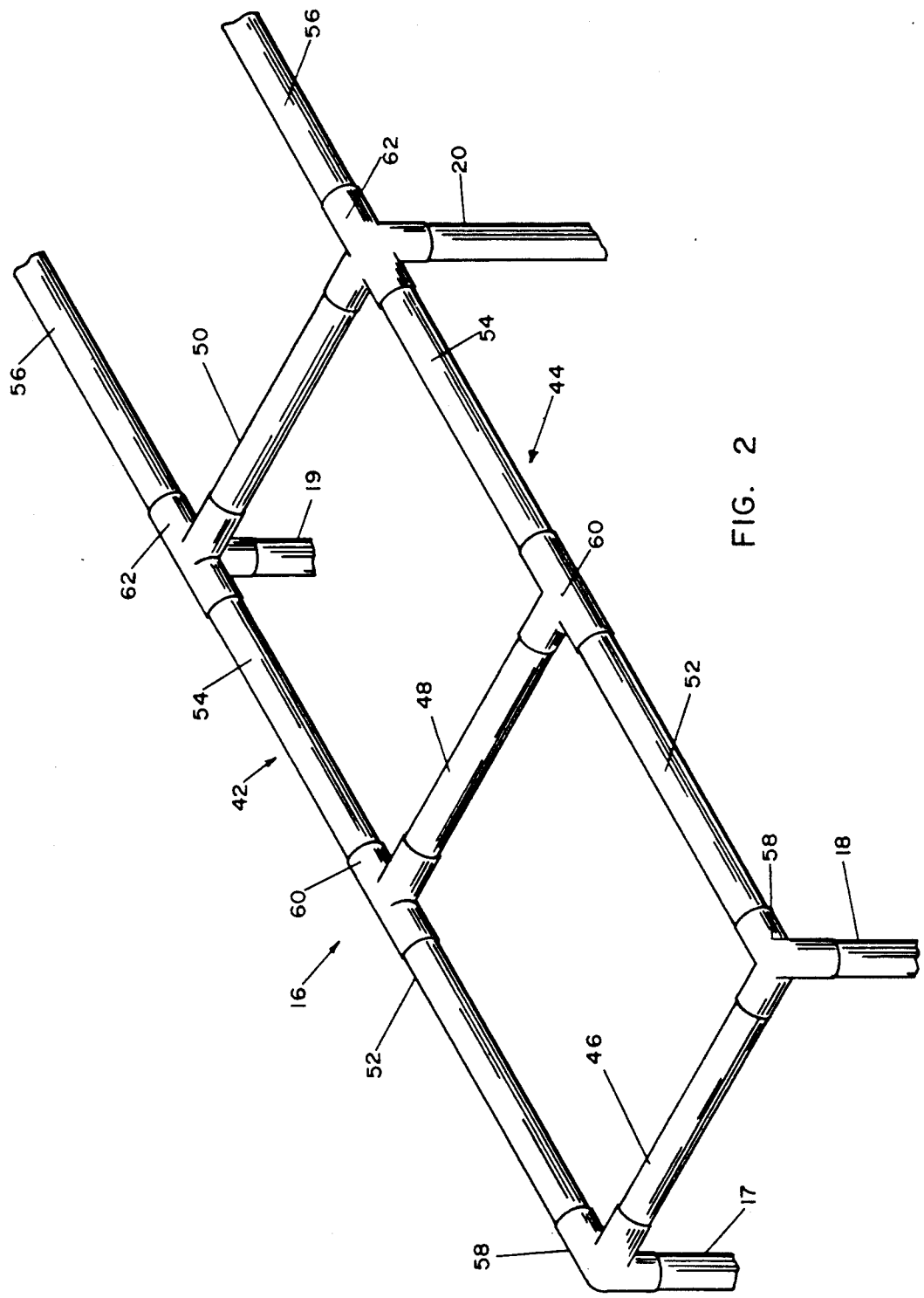
FIG. 2 is a perspective view of a portion of the top section of the preferred embodiment of the invention showing the corner posts attached thereto.
Figure 4:
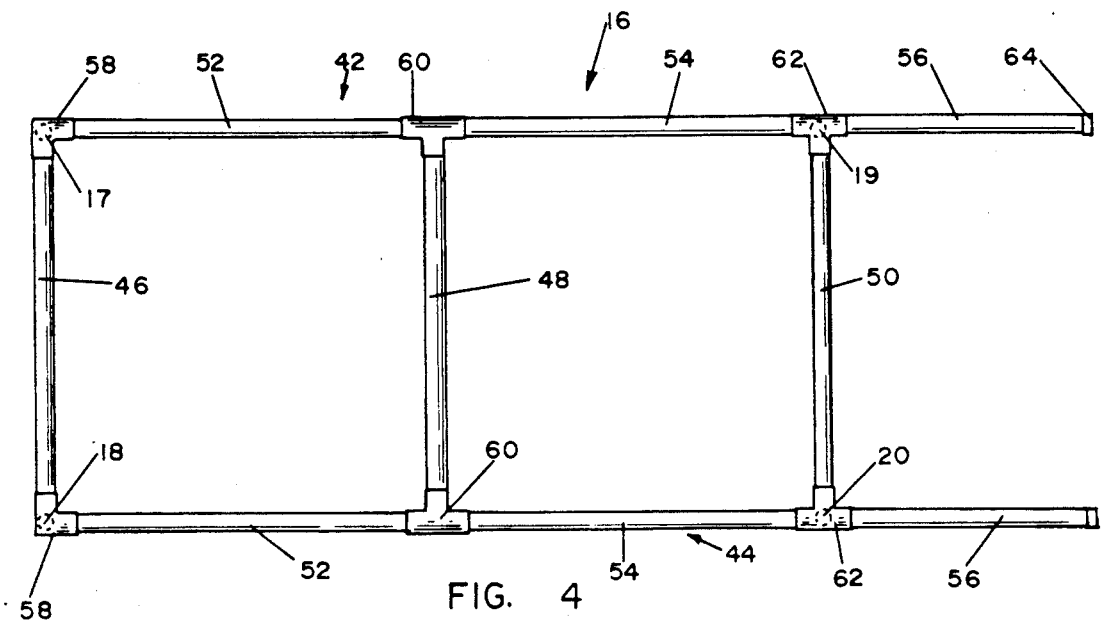
FIG. 4 is a top plan view of the top section of the preferred embodiment of the invention.

As also shown in FIGS. 1, 2 and 4, top section 16 is comprised of a pair of parallel side members 42 and 44 and three parallel cross members 46, 48 and 50. Each of parallel side members 42 and 44 includes three PVC pipes 52, 54 and 56, a three-way elbow fitting 58, a T-fitting 60, a four-way elbow fitting 62 and an end cap 64 (FIGS. 1 and 4). Cross member 46, designated as the front cross member, is secured to each of the three-way elbow fittings 58, cross member 48, designated as the intermediate cross member, is secured to T-fittings 60 and cross member 50, designated as the rear cross member, is secured to four-way elbow fittings 62. The parts making up top section 16 are secured to each other by PVC cement or stainless steel screws 41 in the arrangement depicted in FIGS. 1, 2 and 4.

As further shown in FIGS. 1 and 2, top section 16 is joined to bottom section 12 in spaced-apart relationship through PVC corner posts 17, 18, 19 and 20. The front corner posts 17 and 18 are secured to the four-way elbow fittings 34 (FIG. 1) of bottom section 12 and to the three-way elbow fittings 58 of top section 16. The rear corner posts 19 and 20 are secured to the four-way elbow fittings 34 of bottom section 12 and the four-way elbow fittings 62 of top section 16.

A pair of wheels 66 and 68 are mounted on the ends of axle 70 which extends through front cross member 30 of bottom section 12. Wheels 66 and 68 are fastened to axle 70 by fasteners 71. A short PVC pipe 72 is secured to each of the four-way fittings 34 forming a part of rear cross member 32 of bottom section 12 for leveling the utility cart when it is in its stationary, storing, position. An end cap 74 is secured to the bottom ends of each of PVC pipes 72.

Figure 3:
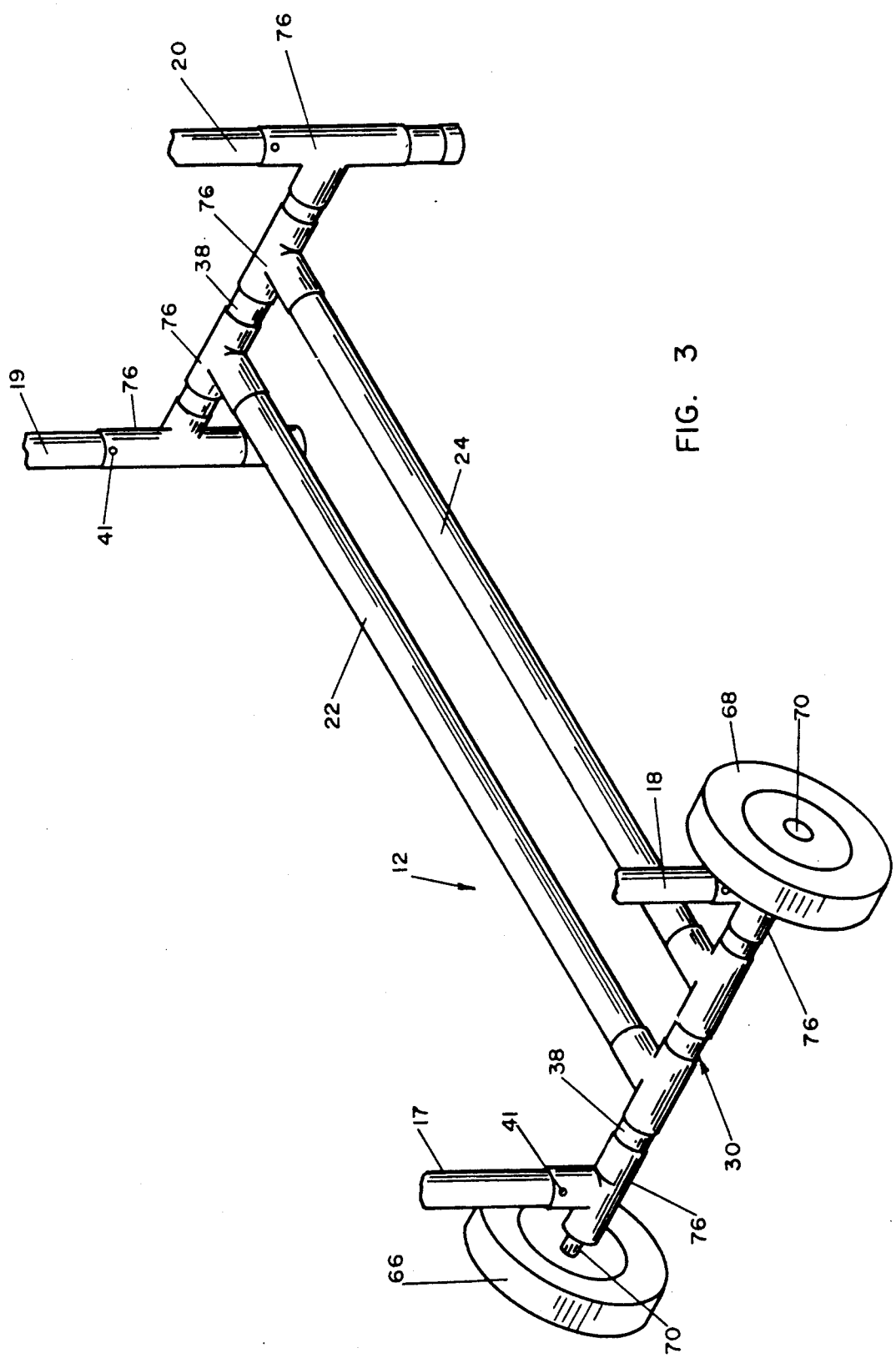
FIG. 3 is a perspective view of the bottom section of another embodiment of the invention showing the corner posts attached thereto.
Figure 5:
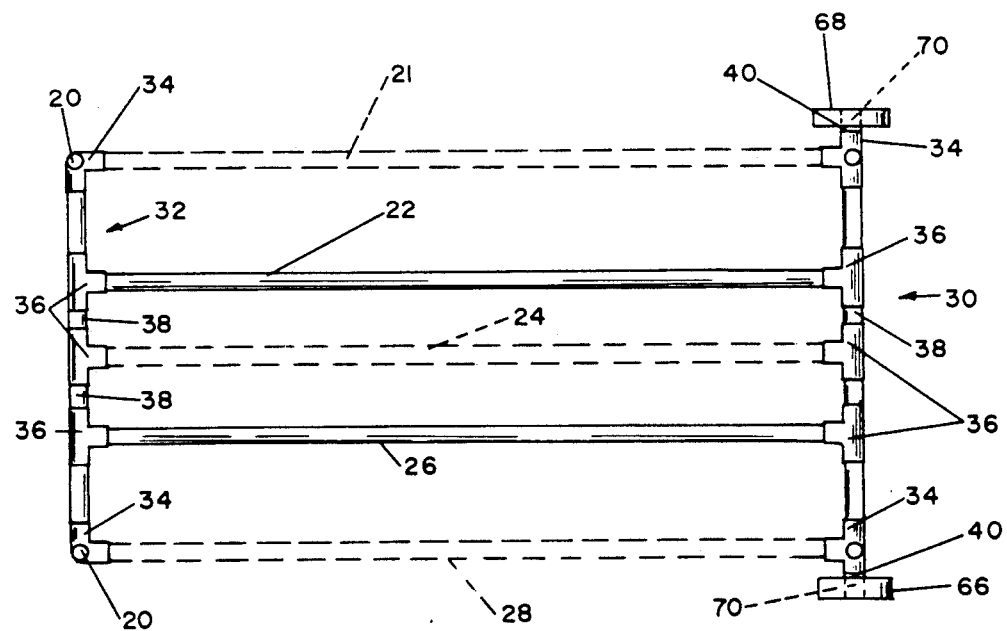
FIG. 5 is a top plan view of the invention showing the embodiment of FIG. 3 in solid lines and the preferred embodiment of FIG. 1 in both solid and dotted lines.

As is readily apparent, the utility cart of the present invention can be modified to support, store and transport any number of containers 14 and can be made of either round or square pipes or pipes of other cross-sectional configurations. Only one container 14 is shown in the drawing to provide a better depiction of cart 10. As in further readily apparent, bottom section 12 of the utility cart of the present invention can be comprised of fewer or more of parallel pipes 21, 22, 24, 26 and 28 for supporting containers 14. For example, FIGS. 3 and 5 show an embodiment wherein bottom section 12 incorporates pipes 22 and 24 only, and substitutes three-way elbow fittings 76 for four-way elbow fittings 34 in front cross member 30 for connection to corner posts 17 and 18. Front member 46 and rear cross member 50 of top section 16 may have a filament such as rope or chain 78 secured thereto for attachment to lid 15 of trash container 14 so that they cannot be removed from the vicinity of the utility cart 10.

The entire utility cart of the present invention could be assembled at the factory and furnished the retailer in an assembled condition. However, to reduce shipping and storage expenses, the utility cart can be either assembled in sections such as top section 16, bottom section 12, corner pipes 17, 18, 19 and 20, wheels 66, and axle 70 or as individual pieces at the factory.

While the above description constitutes preferred embodiments of the present invention, it will be appreciated that the invention is susceptible to modification, variation and change without departing from the proper scope and fair meaning of the accompanying claims.

I claim:

1. A utility cart for supporting, storing and transporting trash containers comprising:

a lower frame member including a front cross element having opposed ends, a rear cross element having opposed ends, a plurality of parallel pipes connected to said front and rear cross elements and running perpendicularly thereto for supporting said trash containers, bearing means mounted on said opposed ends of said front cross element, an axle extending through said front cross element and said bearing means, a pair of wheels mounted on said axle, means for securing said wheels to said axle, and means secured to said rear cross element for leveling said plurality of parallel pipes when said cart is in a storing position;

an upper frame member including a front cross member having opposed ends, a rear cross member having opposed ends, at least one intermediate cross member having opposed ends, and a pair of parallel side elements connected to said opposed ends of said front, rear and intermediate cross members and being perpendicular to said front, rear and intermediate cross members for maintaining said trash containers in upright, stable, positions, each of said side elements having a portion extending beyond said rear cross element in planar relationship to said side element to form handles for engagement by a person for pushing or pulling said cart; and four corner posts, each being connected to said opposed ends of said front and rear cross elements of said lower frame member and said opposed ends of said front and rear cross members of said upper frame member for holding said lower and upper frame members in spaced-apart relationship.

2. The utility cart of claim 1 wherein said opposed ends of said front and rear cross elements of said lower frame member are connected to said corner posts by four-way elbow fittings forming a part of said front and rear cross elements of said lower frame member and said opposed ends of said front and rear cross members of said upper frame member are connected to said corner posts by three-way elbow fittings forming a part of said front and rear cross members of said upper frame member.

3. The utility cart of claim 1 wherein said opposed ends of said front and rear cross elements of said lower frame member and said opposed ends of said front and rear cross members of said upper frame member are connected to said corner posts by three-way fittings forming a part of each of said front and rear cross elements of said lower frame member and said front and rear cross members of said upper frame member.

4. The utility cart of claim 1 wherein each of said trash containers has a lid and said front and rear cross members of said upper frame member include means for securing each of said lids to said cart.

5. A utility cart particularly adapted for supporting, storing and transporting trash containers comprising:

a lower frame member including front and rear cross elements interconnected by means for supporting said trash containers, each of said front and rear cross elements having opposed ends;

an upper frame member including a front cross member, a rear cross member and at least one intermediate cross member interconnected at their ends by means for holding said trash containers in upright, stable, positions;

means connected to said lower frame member and said upper frame member at said ends of said front and rear cross elements for holding said frame members in a spaced-apart relationship;

bearing means on said opposed ends of said front cross element;

an axle extending through said front cross element and said bearing means;

a pair of wheels carried by said axle;

means for holding said wheels upon said axle; and means secured to said rear cross element of said lower frame member for leveling said means for supporting said trash containers when said cart is in a storing position;

said upper frame member including a pair of handles in planar relationship with said means for holding said trash containers in upright, stable, positions for engagement by a person for pushing or pulling said cart;

said means for supporting said trash containers including a plurality of parallel pipes and said means for interconnecting said upper and lower frame members including a plurality of parallel corner pipes.

6. The utility cart of claim 5 wherein said opposed ends of said front and rear cross elements of said lower frame member are connected to said corner pipes by four-way elbow fittings forming a part of said front and rear cross elements of said lower frame member and said opposed ends of said front and rear cross members of said upper frame member are connected to said corner pipes by three-way elbow fittings forming a part of said front and rear cross member of said upper frame member.

7. The utility cart of claim 5 wherein said opposed ends of said front and rear cross elements of said lower frame member and said opposed ends of said front and rear cross members of said upper frame member are connected to said corner pipes by three-way fittings forming a part of each of said front and rear cross elements of said lower frame member and said front and rear cross members of said upper frame member.

8. The utility cart of claim 6 wherein each of said front and rear cross elements of said lower frame member further comprises three T-fittings and four short pipes, each of said Tfittings being joined to two of said short pipes and to one of said pipes which supports said trash containers.

9. The utility cart of claim 7 wherein each of said front and rear cross elements of said lower frame member further comprises two T-fittings and three short pipes, each of said T-fittings being joined to two of said short pipes and to one of said pipes which supports said trash containers.

* * * * *